United States Patent [19]

Fortmann et al.

[11] Patent Number: 5,726,409
[45] Date of Patent: Mar. 10, 1998

[54] PROCESS AND DEVICE FOR DETERMINING A TEMPERATURE AT A SPOT WELD AND PROCESS FOR EVALUATING THE QUALITY OF THE SPOT WELD

[75] Inventors: Manfred Fortmann, Much; Volkhard Künnemann, Engelskirchen, both of Germany

[73] Assignee: Siemens Aktiengesellschaft, Munich, Germany

[21] Appl. No.: 605,469

[22] Filed: Feb. 26, 1996

Related U.S. Application Data

[63] Continuation of PCT/DE94/00950 Aug. 19, 1994.

[30] Foreign Application Priority Data

Aug. 24, 1993 [DE] Germany ............ 43 28 337.3

[51] Int. Cl.$^6$ ........................... B23K 11/25
[52] U.S. Cl. ........................... 219/109; 219/110
[58] Field of Search ........................... 219/109, 110, 219/117.1

[56] References Cited

U.S. PATENT DOCUMENTS

| | | | |
|---|---|---|---|
| 5,298,711 | 3/1994 | Leon | 219/109 |
| 5,399,827 | 3/1995 | Fortmann | 219/109 |
| 5,495,088 | 2/1996 | Leon | 219/109 |

FOREIGN PATENT DOCUMENTS

| | | |
|---|---|---|
| 252 778 | 12/1987 | Germany . |
| 268 648 | 6/1989 | Germany . |
| 2 231 521 | 11/1990 | United Kingdom . |
| 92/10326 | 6/1992 | WIPO . |

OTHER PUBLICATIONS

Publication Schweißen und Schneiden 45 (1993) No. 6, (Faber et al.), pp. 308–313, "Temperaturmessung . . .".

*Primary Examiner*—Clifford C. Shaw
*Attorney, Agent, or Firm*—Herbert L. Lerner; Laurence A. Greenberg

[57] ABSTRACT

A process for determining a temperature at a spot weld formed between two parts being made of at least one first metal by at least one electrode being made of a second metal and being in contact with one of the parts, includes determining a first measurement value for a thermoelectric voltage between the electrode and the parts prior to forming the spot weld. A second measurement value is determined for a thermoelectric voltage between the electrode and the parts after forming the spot weld. The temperature is determined by taking both measurement values into account. A device for determining a temperature at the spot weld includes at least one volt meter for ascertaining a thermoelectric voltage between the electrode and the parts, corresponding to a temperature. A control unit records at least one first measurement value for the thermoelectric voltage prior to formation of a spot weld and at least one second measurement value for the thermoelectric voltage after the formation of the spot weld. A first memory stores the first measurement value and a second memory stores the second measurement value. A subtractor forms a difference between the first measurement value stored in the first memory and the second measurement value stored in the second memory and determines the temperature from the difference. Another process uses the device for evaluating the quality of a spot weld.

14 Claims, 1 Drawing Sheet

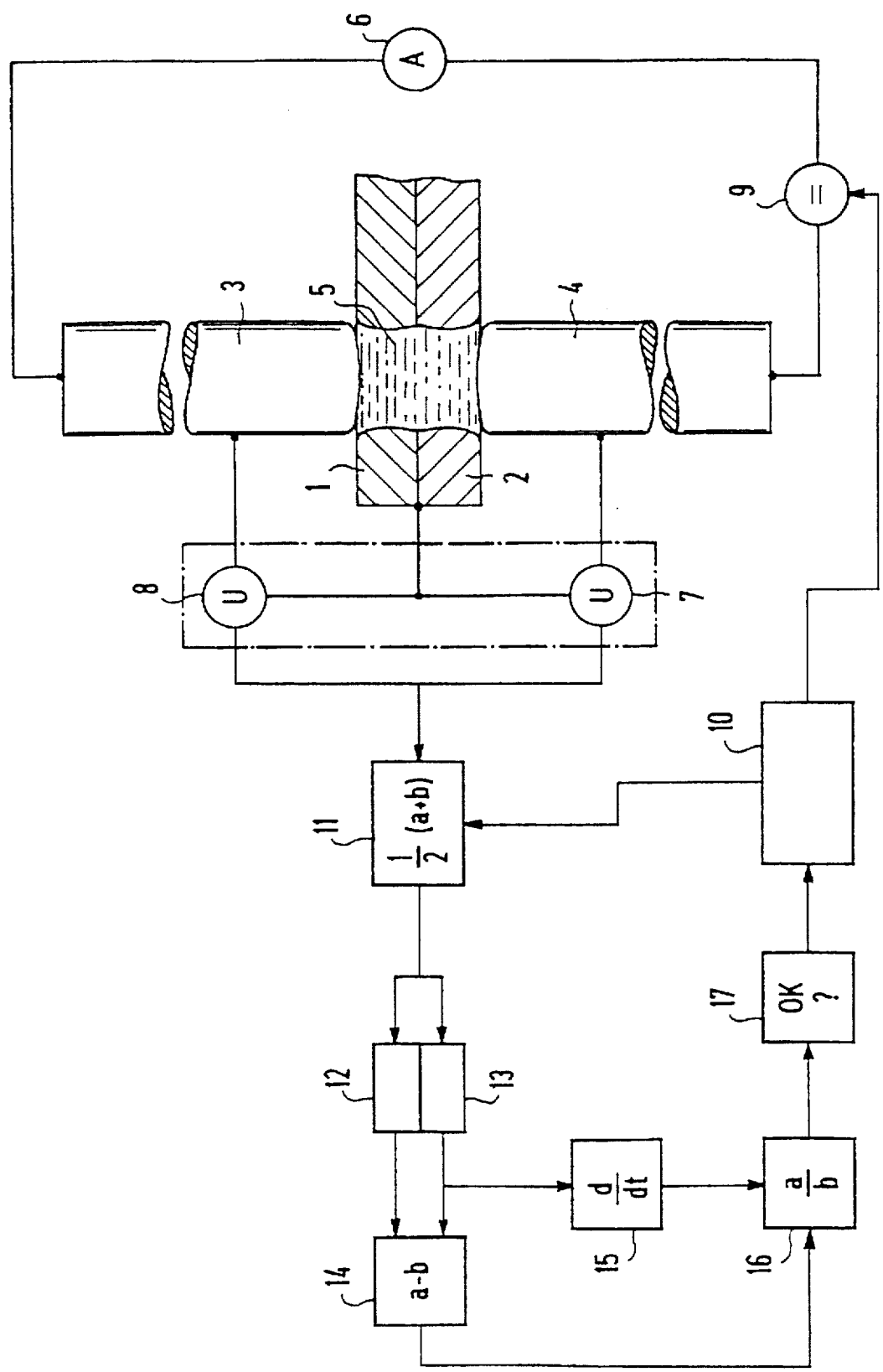

PROCESS AND DEVICE FOR DETERMINING A TEMPERATURE AT A SPOT WELD AND PROCESS FOR EVALUATING THE QUALITY OF THE SPOT WELD

CROSS-REFERENCE TO RELATED APPLICATION

This application is a Continuation of International Application Ser. No. PCT/DE94/00950, filed Aug. 19, 1994.

BACKGROUND OF THE INVENTION

FIELD OF THE INVENTION

The invention relates to a process and a device for determining a temperature at a spot weld between two parts being made of at least one first metal, the spot weld being formed by at least one electrode being made of a second metal and being in contact with one of the parts, and the temperature being ascertained from a thermoelectric voltage measured between the electrode and the parts. The invention also relates to a process and a device for evaluating the quality of a spot weld.

A process and a device for determining a temperature at a spot weld and a process and a device for evaluating the quality of a spot weld, are taught by Published International Patent Application WO 92/10326, which is the point of departure for the invention and the entire contents of which are hereby incorporated by reference into the present disclosure.

Information on determining a temperature at a spot weld can also be found from East German Patent DD 252 778 A1 and an article entitled "Temperaturmessung beim Widerstand-schweißen" [Temperature Measurement in Resistance Welding] by W. Faber and M. Uhlmann, in the publication entitled: Schweißen und Schneiden [Welding and Cutting] 45 (1993) pages 308–313. East German Patent DD 252 778 A1 relates to determining a temperature during the forming of the spot weld, where in particular the thermal voltage to be measured is to be separated from the voltage applied by the welding tool to the workpieces to be welded. The article relates to the choice of materials for the electrode and the workpiece, in order to achieve a thermovoltage between the electrode and workpiece that exhibits a marked temperature dependency.

Spot welds are often used, especially in automotive engineering, where metal parts and in particular sheet-metal parts are to be joined together. Often, such spot welds not only serve to stitch together components temporarily but are also intended to act as final connections and therefore must be capable of withstanding all of the strains to which the joined-together components can properly be exposed. There is accordingly a need to be able to evaluate the quality of the spot weld, in order to carry out quality assurance.

One determinative factor for the quality of a spot weld is the heat development in the zone where the spot weld is to be made. In particular, a large enough molten bath between the parts to be joined together must be attained. If the electric current that is to bring about the heat development flows not only through the zone where the spot weld is to be made but also through other connections (typically called "shunts"), then that can considerably impair the quality of the resultant spot weld and may perhaps prevent the creation of the spot weld at all. Especially in the course of automated manufacturing processes, there is a need for ongoing evaluation of the quality of spot welds, so that unsatisfactory spot welds can be detected immediately and rejected. Random checks of spot welds, which need not necessarily be nondestructive tests, are not considered adequate, under some circumstances, to assure the desired quality of spot welds.

The process taught in Published International Patent Application WO 92/10326 for determining a temperature at a spot weld, which is particularly suitable for use in the context of evaluating the quality of a spot weld, can lead to problems if temperature measurements are to be carried out at numerous spot welds which are formed in rapid chronological succession. If spot welds are made with an electrode in more or less rapid succession, the electrode may heat up significantly and thus significantly affect the thermoelectric voltage to be measured between it and the parts that are to be joined together. The consequence can be that a common criterion for deciding on the quality of a spot weld fails, in that intrinsically good spot welds are rejected as worthless.

SUMMARY OF THE INVENTION

It is accordingly an object of the invention to provide a process and a device for determining a temperature at a spot weld and a process for evaluating the quality of the spot weld, which overcome the hereinafore-mentioned disadvantages of the heretofore-known processes and devices of this general type, which are largely invulnerable to a change in a temperature of an electrode and yet in which additional equipment expense remains slight as much as possible.

With the foregoing and other objects in view there is provided, in accordance with the invention, a process for determining a temperature at a spot weld formed between two parts being made of at least one first metal by at least one electrode being made of a second metal and being in contact with one of the parts, which comprises determining a first measurement value for a thermoelectric voltage between the at least one electrode and the parts prior to forming the spot weld; determining a second measurement value for a thermoelectric voltage between the at least one electrode and the parts after forming the spot weld; and determining the temperature by taking both the first and the second measurement values into account.

The invention is based on the recognition that detecting the thermoelectric voltage between the electrode and the parts before the spot weld is made permits an adequate and moreover easily used statement about the temperature of the electrode, especially on the condition that the temperature of the parts to be welded together remains largely constant. Correspondingly, by evaluating a measurement value obtained before the formation of the spot weld together with measurement values that are obtained after the formation of the spot weld, a statement about the temperature at the spot weld can be made that is largely independent of the temperature of the electrode. The expense for equipment and for the process entailed in realizing the invention is very slight, because virtually every spot welding process involves a period of time, between when the electrode is placed on the parts to be welded and when the spot weld is actually formed, that is long enough for measuring the thermoelectric voltage. Making such a measurement typically takes no more than 20 ms. In the electronic evaluation devices usually used, the effort and expense for evaluating the additional measurement value also remain within narrow limits.

In accordance with another mode of the invention, the temperature at the spot weld is determined from the difference between the first and second measurement values, which is largely exact if there is a linear dependency of the thermoelectric voltage on the electrode temperature. In the event that there is a nonlinear dependency of the thermoelectric voltage on the electrode, which can happen in certain combinations of a first and second metal, as a rule this principle is adequate for practical purposes, especially on the condition that the electrode temperature not vary overly severely.

In accordance with a further mode of the invention, the spot weld is formed with two electrodes disposed on opposite sides of the parts and the thermoelectric voltage is determined between each electrode and the respective parts. The first measurement value and the second measurement value are each formed as a mean value of the corresponding thermoelectric voltages measured at the electrodes. This makes it possible to increase the accuracy of the measurement.

In accordance with an added mode of the invention, in order to further increase the measurement accuracy and optionally to also gain access to other determinative variables for the quality of the spot weld, a course over time is determined for at least one of the measurement values, in particular for the second measurement value. The course over time, as will be explained below, is a variable which is particularly useful in evaluating the quality of the spot weld. In accordance with an additional mode of the invention, the temperature for each spot weld is determined from many spot welds to be formed in succession.

With the objects of the invention in view, there is also provided a device for determining a temperature at a spot weld formed between two parts being made of at least one first metal by at least one electrode being made of a second metal and being in contact with one of the parts, comprising at least one volt meter for ascertaining a thermoelectric voltage between the at least one electrode and the parts, corresponding to a temperature; a control unit for recording at least one first measurement value for the thermoelectric voltage prior to formation of a spot weld and at least one second measurement value for the thermoelectric voltage after the formation of the spot weld; a first memory connected to the at least one volt meter for storing the at least one first measurement value; a second memory connected to the at least one volt meter for storing the at least one second measurement value; and a subtractor connected between the first and second memories and the control unit for forming a difference between the at least one first measurement value stored in the first memory and the at least one second measurement value stored in the second memory and for determining the temperature from the difference.

The function of this device is directly explained by the remarks given with respect to the process according to the invention.

The difference to be determined in accordance with the invention is a measure of the temperature prevailing at the spot weld, referred to the temperature at the corresponding point prior to formation of the spot weld.

The difference is therefore a direct measure for the energy that has been brought to bear at the corresponding point to form the spot weld. It therefore permits a reliable statement to be made about the spot weld.

In accordance with another feature of the invention, there are provided two volt meters each being associated with one of two electrodes that can be disposed on opposed sides of the parts, and a mean value former which forms one mean value from two values simultaneously measured with the volt meters each time and furnishes it as the first or second measurement value. This embodiment makes it possible in particular to average the thermal voltages between the electrodes and both parts, which increases the reliability of the measurement and of the temperature determination.

In accordance with a further feature of the invention, the second memory can store many second measurement values, the subtractor can form a mean value of the second measurement values stored in the second memory, and moreover there is provided a differentiator for forming a chronological derivation of the mean value formed by the subtractor and a divider for forming a quotient of the difference as the dividend and the derivation as the divisor.

Storing many second measurement values in memory for each spot weld, as described above, has various advantages. First, it is possible to form one mean value for the thermoelectric voltage to be measured from all of the second measurement values stored in memory, and optionally certain values can be selected from among all of the stored measurement values. An analogous advantage is also attainable for the first measurement value, if many measurement values are stored in memory for it as well and suitably averaged, optionally with the selection of a certain portion of the entire set of measurement values. Another factor of significance for the second measurement value is that the course over time of the thermoelectric voltage after the formation of the spot weld can be reconstructed from many measurement values, and a chronological derivation can be determined for the mean value provided for further processing. A quotient formed from the difference and the chronological derivation is an especially preferred value for determining the quality of the spot weld being formed, because it is dependent both on the total energy introduced into the spot weld and on the way in which the spot weld cools down after being formed. As discussed in detail in Published International Patent Application WO 92/10326 which is incorporated by reference, the course over time of the thermoelectric voltage after the formation of the spot weld is determined substantially as a function of whether or not an adequate flow of material of the parts to be welded together has occurred in the formation of the spot weld.

In accordance with an added feature of the invention, an evaluation of the quotient just described above is performed with an analyzer that follows the divider; the analyzer also issues a report to the control unit as to whether the quotient can be considered reliable or unreliable.

In accordance with an additional feature of the invention, the control unit can further process this report and carry it to a welding current source, which is provided for furnishing current to form the spot weld. In particular, the output of the current is controlled on the basis of the report, so as to assure adequate quality for further spot welds that are to be formed.

The process and the device are used highly advantageously to determine a temperature for each spot weld of many spot welds, which are to be formed in more or less rapid succession. Although the temperature of an electrode or a configuration of a plurality of electrodes used for this purpose can vary markedly when there is such a succession of many welding processes, a constant reliable statement about the temperature of each individual spot weld is obtained through the use of the process.

With the objects of the invention in view, the process and the device are additionally provided for determining a temperature at a spot weld for evaluating the quality of the spot weld.

In accordance with another mode of the invention, the difference between the first and the second measurement value and moreover besides the second measurement value itself its chronological derivation, are determined, and a quotient of the difference as the dividend and the chronological deviation as the divisor is formed for evaluating the quality. This quotient may be used more or less directly as a variable for evaluating the quality of the spot weld. Naturally, this does not preclude its being subjected to further arithmetic processing, in particular scaling, in the course of the evaluation process.

In accordance with a concomitant mode of the invention, the process and the device evaluate the quality of each spot weld from many successively formed spot welds, in such a manner that the quotient is formed for each spot weld. This assures a reliable evaluation of the quality even of spot welds that are formed in more or less rapid succession, where marked changes in the temperature of the electrode or electrodes being used occur.

Other features which are considered as characteristic for the invention are set forth in the appended claims.

Although the invention is illustrated and described herein as embodied in a process and a device for determining a temperature at a spot weld and a process for evaluating the quality of the spot weld, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE of the drawing is a fragmentary, diagrammatic, partly sectional view of an exemplary embodiment of a device for forming a spot weld along with a schematic circuit diagram of a device for measuring thermoelectric voltages and for determining a temperature in accordance with the invention.

DESCRIPTION OF THE PREFERRED EMBODIMENTS

Referring now to the single FIGURE of the drawing in detail, it is seen that two parts 1, 2, especially steel sheets, are joined together through the use of a spot weld. Two electrodes 3 and 4, which are formed of a copper alloy, for instance, are put into contact with the pressed-together parts 1 and 2, with the electrodes being opposite one another. Next, with the aid of a welding current source 9, a current, usually a direct current, is applied to the electrodes 3, 4, causing heating and finally locally limited melting. This creates a spot weld 5. When the initially present melt solidifies, the parts 1, 2 are durably joined together, or in any case whenever the spot weld 5 is of adequately high quality. The magnitude of the welding current is measured with the aid of an ampere meter 6, and the voltage located between each electrode 3, 4 and the respective parts 1, 2 during the welding operation is determined with the aid of two volt meters 7 and 8. It is understood that the indication or display of the current or voltage by the ampere meter 6 or volt meters 7 and 8 need not necessarily be performed on an indicating instrument. It is in fact quite conceivable and, in conjunction with modern welding equipment, it is advantageous, for the ampere meter 6 and the volt meters 7 and 8 to send the respective information to a control unit 10. This is not shown for the ampere meter 6, for the sake of simplicity.

The volt meters 7 and 8 each measure a thermoelectric voltage between the corresponding electrode 3 or 4 and the parts 1 and 2, both before the onset and after the end of the spot welding, and optionally after a suitable switchover of their measurement ranges. A thermoelectric voltage is generated between each part 1, 2 and the respective electrode 3 and 4 that is in contact with it as a result of the temperature at the spot weld 5, which decreases gradually at first and at a certain rate after the end of the spot welding. The voltage decreases in a defined way over the course of time, that is over a period of from one-half to one second. The precise course over time is substantially jointly determined by the processes occurring in the spot weld 5. If an adequately large melt is created in the spot weld 5, then the drop in the thermoelectric voltage is markedly slowed as compared with the drop of a thermoelectric voltage when the creation of a melt has failed to occur. The reason for this is that as the melt solidifies, latently stored heat is liberated and acts counter to the drop in the temperature. This subject matter is explained in detail in Published International Patent Application WO 92/10326, which has already been incorporated by reference and discussed at length.

Within the scope of the invention, a thermoelectric voltage is also measured for the beginning of the spot welding, preferably by averaging through measurement values from both voltage meters 7 and 8, and a statement about the temperatures of the electrodes 3 and 4 is derived therefrom. When it is included in the determination of the temperature at the spot weld 5 or the evaluation of the quality of the spot weld 5, the result is a considerable increase in accuracy and replicability, even whenever a large number of spot welds 5 produced in rapid succession is to be evaluated. The measurement values of both volt meters 7 and 8 are supplied to a mean value former 11, which averages the measurement values and, under the control of the control unit 10, stores them in a first memory 12 or a second memory 13. The first memory 12 is intended to store mean values from two first measurement values at a time obtained prior to the formation of the spot weld 5, and the second memory 13 stores mean values of the second measurement values obtained after the formation of the spot weld 5. For the sake of simplicity, the two memories 12, 13 are shown unstructured. However, the second memory 13 should be suitable for storing many mean values of second measurement values and should thus permit recording a course of the temperature at the spot weld 5 shortly after its formation. In order to form a difference between a second measurement value and a first measurement value, which is essential to determining the temperature at the spot weld 5 and which is to be performed in a subtractor 14 following the memories 12 and 13, once again a mean value of the values stored in the second memory should optionally be formed and used in a suitable way. For the sake of simplicity, the devices required for this purpose, which should be understood as belonging preferably to the subtractor 14 since the required operations are arithmetic in nature, are not shown in the drawing. The situation is the same if the first memory 12 is configured to store a plurality of values.

The practical embodiment of the components of the device which process the measurement values or perform control tasks, that is the mean value former 11, the memories 12 and 13, the subtractor 14, a differentiator 15, a divider 16, an analyzer 17 and the control unit 10, may be in the form of either discrete analog or digital component groups or in the form of a suitably programmed computer with suitable interfaces with the volt meters 7 and 8 and the welding current source 9.

In order to evaluate the quality of the spot weld 5, a chronological derivation of the second measurement value is formed, in addition to the aforementioned difference. The differentiator 15 provided at the second memory 13 is provided for this purpose. The differentiator provides the derivation, in the same way as the subtractor 14 provides the difference, to the divider 16, which forms the quotient of the difference as a dividend and the chronological derivation as a divisor. This quotient serves as a measurement variable for evaluating the quality of the spot weld. To that end, it is delivered to the analyzer 17, which decides whether or not the quotient is within a range of values considered allowable for a spot weld 5 of adequate quality. It carries the outcome of this decision to the control unit 10, which in turn acts upon the welding current source 9, for instance by providing it with specifications in order to assure an adequate quality for every further spot weld 5 to be formed.

We claim:

1. A process for determining a temperature at a spot weld formed between two parts being made of at least one first metal by at least one electrode being made of a second metal and being in contact with one of the parts, which comprises:

determining a first measurement value for a thermoelectric voltage between the at least one electrode and the parts prior to forming the spot weld;

determining a second measurement value for a thermoelectric voltage between the at least one electrode and the parts after forming the spot weld; and determining the temperature by taking both the first and the second measurement values into account.

2. The process according to claim 1, which comprises determining the temperature from a difference between the first and second measurement values.

3. The process according to claim 1, which comprises placing one of two electrodes on each respective opposing side of the parts, measuring the thermoelectric voltage between each electrode and the parts, and determining each measurement value as a mean value of the thermoelectric voltages measured at each of the electrodes.

4. The process according to claim 1, which comprises determining a chronological course for at least one of the measurement values.

5. The process according to claim 1, which comprises determining a chronological course for the second measurement value.

6. The process according to claim 1, which comprises determining a temperature for each spot weld from many spot welds to be formed in succession.

7. A device for determining a temperature at a spot weld formed between two parts being made of at least one first metal by at least one electrode being made of a second metal and being in contact with one of the parts, comprising:

at least one volt meter for ascertaining a thermoelectric voltage between the at least one electrode and the parts, corresponding to a temperature;

a control unit for recording at least one first measurement value for the thermoelectric voltage prior to formation of a spot weld and at least one second measurement value for the thermoelectric voltage after the formation of the spot weld;

a first memory connected to said at least one volt meter for storing the at least one first measurement value;

a second memory connected to said at least one volt meter for storing the at least one second measurement value; and a subtractor connected between said first and second memories and said control unit for forming a difference between the at least one first measurement value stored in said first memory and the at least one second measurement value stored in said second memory and for determining the temperature from the difference.

8. The device according to claim 7, wherein the at least one electrode is two electrodes to be disposed on opposed sides of the parts, said at least one volt meter is two volt meters each being associated with a respective one of the two electrodes, and including a mean value former connected between said volt meters and said first and second memories for forming a mean value from two values at a time being measured simultaneously with said volt meters and furnishing the mean value as the first or second measurement value.

9. The device according to claim 7, wherein said second memory stores many second measurement values, said subtractor forms a mean value of the second measurement values stored in said second memory, and including a differentiator connected to said subtractor for forming a chronological derivation of the mean value formed by said subtractor, and a divider connected to said differentiator for forming a quotient of the difference as a dividend and the derivation as a divisor.

10. The device according to claim 9, including an analyzer connected between said divider and said control unit for evaluating the quotient and outputting a report to said control unit as to whether the quotient is considered permissible or impermissible.

11. The device according to claim 10, including a welding current source connected to the at least one electrode for furnishing current to form the spot weld, said control unit being connected to said welding current source for controlling a current output.

12. A process for evaluating the quality of a spot weld, which comprises:

determining a temperature at a spot weld formed between two parts being made of at least one first metal by at least one electrode being made of a second metal and being in contact with one of the parts, by:

determining a first measurement value for a thermoelectric voltage between the at least one electrode and the parts prior to forming the spot weld;

determining a second measurement value for a thermoelectric voltage between the at least one electrode and the parts after forming the spot weld; and determining the temperature by taking both the first and the second measurement values into account.

13. The process according to claim 12, which comprises forming a difference between the first and second measurement values, determining a chronological derivation of the second measurement value in addition to the second measurement value, and forming a quotient of the difference as a dividend and the chronological deviation as a divisor for evaluating the quality.

14. The process according to claim 13, which comprises evaluating the quality of each spot weld from many successively formed spot welds by forming the quotient for each spot weld.

* * * * *